United States Patent [19]
Mahneke

[11] 3,918,260
[45] Nov. 11, 1975

[54] WAVED-POWERED DRIVING APPARATUS

[76] Inventor: Klaus M. Mahneke, 228-66th St., Delta, British Columbia, Canada

[22] Filed: Dec. 30, 1974

[21] Appl. No.: 537,578

[52] U.S. Cl. .................... 60/500; 60/504; 417/330
[51] Int. Cl.² .......................................... F03G 7/00
[58] Field of Search ............................ 60/497–504; 417/330–334, 337

[56] References Cited
UNITED STATES PATENTS

| | | | |
|---|---|---|---|
| 822,067 | 5/1906 | Mowen | 60/504 X |
| 3,297,300 | 1/1967 | Mountanos | 60/504 X |

Primary Examiner—Allen M. Ostrager
Attorney, Agent, or Firm—Fetherstonhaugh & Co.

[57] ABSTRACT

Driving apparatus operable by wave action and having a flexible member connecting a small subsurface float to a relatively large surface float. The apparatus includes spaced pulleys supported near the ocean floor by a heavy anchor with an intermediate portion of the flexible member trained over the pulleys so that the pulleys are rotated by the reciprocating flexible member as the floats rise and fall due to wave action. Rotational movement of one or both of the pulleys is transmitted to a shaft which is utilized as a power take-off shaft to drive a machine or the like.

5 Claims, ing Figures

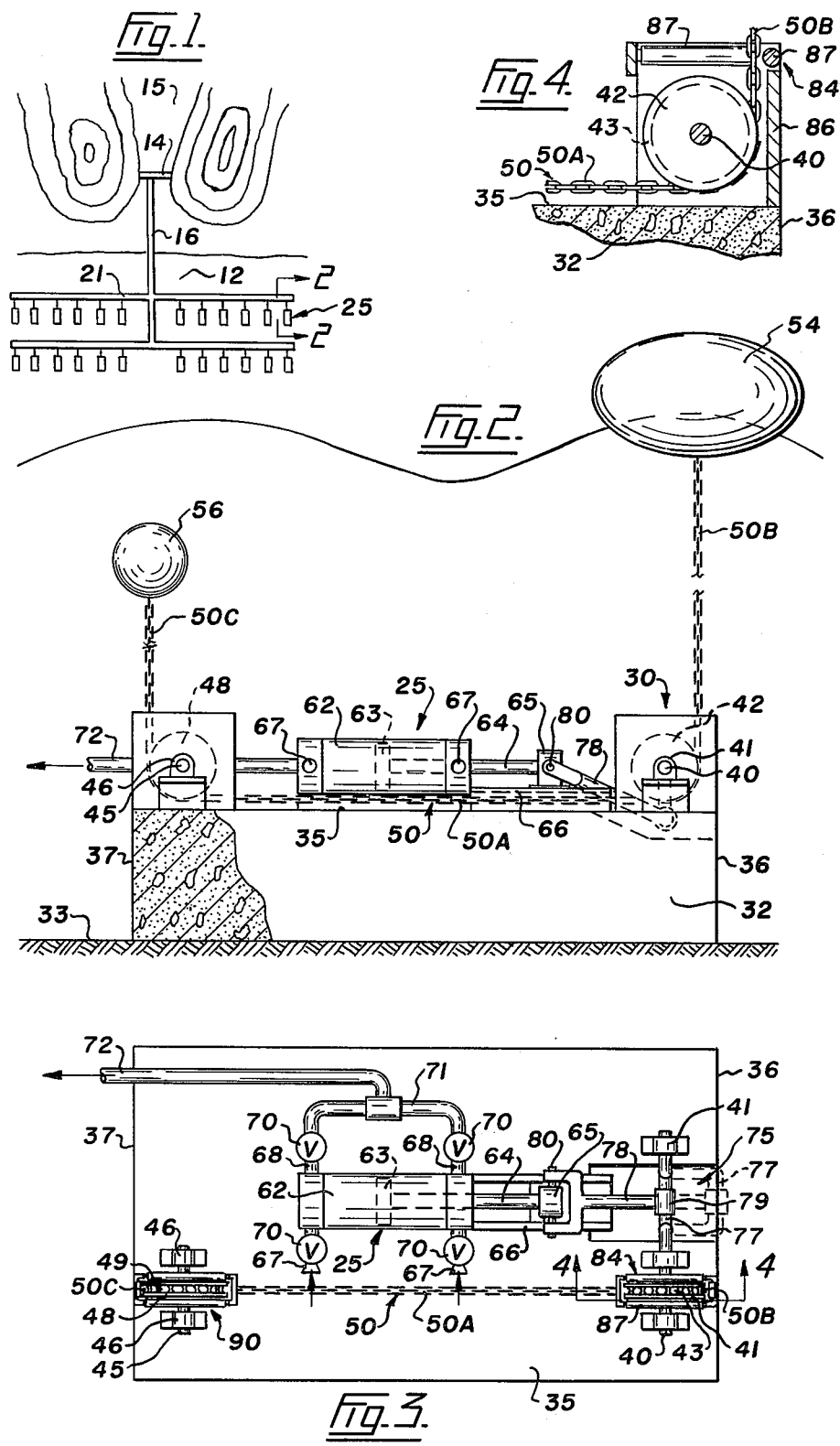

WAVED-POWERED DRIVING APPARATUS

My invention relates to driving apparatus and more particularly to apparatus which is operable by the action of waves.

The movement of waves has long been recognized as a useful source of energy and a number of suggestions have been put forward as to how this energy might be utilized. One of the uses suggested for this normally wasted source of energy is in the production of electricity. If a sufficiently large volume of sea water could be pumped to a high level storage lake on land, the head of water provided by such a lake could be used to drive conventional electric turbines before being returned to the sea. The viability of such a hydroelectric system would be dependent upon a pumping system having the capacity to deliver water to the lake at extremely low cost and the present invention is concerned with apparatus which will provide the power to drive a battery of pumps although it will serve equally as well to power other equipment used for different purposes.

To this end, I provide wave-powered driving apparatus which is simply yet sturdily constructed so as to be able to operate effectively in the rough seas and strong tides likely to be encountered near a shore where the necessary wave action is known to exist. The apparatus is designed to take maximum advantage of the rise and fall of the waves while avoiding, as much as possible, such wasted movements in other directions which would impose excessive strain on the operating parts and almost certainly lead to frequent breakdowns requiring maintenance which would be difficult to perform in an offshore location.

More specifically, the apparatus according to the present invention may be defined as wave-powered driving apparatus which comprises anchor means adapted to be supported in a body of water the surface of which is subject to wave action, a rotatable device secured to the anchor means, flexible member having an intermediate portion thereof in driving engagement with the rotatable device, a first and a second float secured to opposite ends of the flexible member and cooperating with the rotatable device whereby said flexible member normally is supported in a substantially U-shaped configuration, said first float riding the water surface and having greater buoyancy than the second float whereby said second float is maintained submerged below the surface of the water and above the rotatable device during variations in tide and wave action, and power take-off means operatively connected to the rotatable device.

In drawings which illustrate a preferred embodiment of the invention:

FIG. 1 is a schematic view showing, by way of example, a sea water pumping and storage system where a number of wave powered driving apparatuses constructed in accordance with the present invention could be usefully employed, FIG. 2 is an enlarged side elevation taken on the line 2—2 of FIG. 1, FIG. 3 is a plan view taken on the line 3—3 of FIG. 2, and FIG. 4 is a further enlarged vertical section taken on the line 4—4 of FIG. 3.

Referring to schematic FIG. 1, the numeral 10 indicates an exposed beach where waves from the sea 12 are known to break while the moderately shallow water just beyond the breakers is swept by the partially formed waves so that the water surface rises and falls. A dam 14 is shown some distance from the beach and at the head of a valley which allows a storage lake 15 to be formed. The stored sea water may be used for generating electricity by means of conventional hydroelectric equipment, not shown, before the water is returned to the sea. A supply pipe 16 extends from behind the dam to a point a suitable distance off shore and this pipe has a number of branches 21 each of which is connected to a large number of appropriately spaced pumps each generally indicated by the numeral 25.

In FIGS. 2 and 3, each pump 25 is shown operatively connected to wave-powered driving apparatus generally indicated at 30. Only one pump 25 is illustrated but it will be appreciated there could a large number of such pumps arranged to be driven by each apparatus 30. The wave-powered driving apparatus 30 comprises a heavy anchor block 32 which preferably is a large reinforced concrete structure or great weight so that it is not likely to be moved across the ocean floor 33 by wind or tide action. This oblong block 32 has a top face 35 as well as end edges 36 and 37. The block originally could be hollow to allow it to be filled with sand or gravel after positioning on the ocean floor.

Mounted on the top face 35 near end edge 36 is a transversely extending shaft 40 which is journalled in bearings 41. Shaft 40 is fitted with a rotatable device which desirably is a large pulley 42 having a chain-receiving groove 43, see particularly FIG. 3. This rim groove 43 of the pulley is of the "catspaw" or sprocket type designed to provide a non-skid driving engagement with chain links such as are found on anchor chains and the like.

Another shaft 45 is provided on the anchor block near end edge 37, this shaft being journalled in bearings 46. A similarly constructed pulley 48 is non-rotatably secured to the shaft 45 in alignment with the pulley 42. Pulley 48 preferably has a sprocket-type rim groove 49, shown best in FIG. 3.

The numeral 50 indicates generally a length of chain which passes beneath the pulleys 42 and 48 so that an intermediate portion 50A of the chain lies parallel to the top face 35 of the anchor block. A float 54 is secured to one end of this chain and this float is adapted to ride on the surface of the water whereby a portion 50B of the chain normally extends upwardly from the pulley 42. The opposite end of the chain is fitted with a float 56 to provide another chain portion 50C extending upwardly from the pulley 48. The float 54 is larger and has considerably greater buoyancy than the float 56 and the arrangement is such that the latter float is disposed some distance below the water surface and also a suitable distance above the anchor block.

The relative sizes of the floats 54 and 56 is important to the operation of the wave-powered driving apparatus 30 since the chain 50 must be kept reasonably taut and in proper driving engagement with the pulleys 42 and 48. As previously stated, the large float 54 keeps the smaller float 56 fully immersed at all times taking into consideration the maximum high and low tides known to exist in the vicinity. The buoyancy of the float and the length of the chain keep the float 56 always below the surface of the water but clear at all times from the remainder of the apparatus 30 as well as the pump 25. Thus, the float 56 is free to move vertically in this defined zone without ever breaking the water surface or striking the pulley 48 or adjacent structures.

At the same time, the float 56 has sufficient buoyancy to maintain the float 54 partly immersed in the surface of the sea. Float 54 is less likely to be bounced about in response to small waves or to be unduly effected by strong winds. The chain 50 is quite firmly tensioned by the two floats and the spacing of the pulleys 42 and 48 combined with the action of the floats keep the chain in the U-shaped configuration shown in FIG. 2 which has been found best for the operation of the apparatus.

It will be apparent that, as waves sweep over the apparatus 30 the floats 54 and 56 rise and fall which will cause the chain 50 to wind back and forth so as to rotate the pulleys 42 and 48 first in one direction and then in the other direction. This movement is used to drive one of the pumps 25, see FIGS. 3 and 4, which is shown to have a cylinder 62 fitted with a piston 63 to which a rod 64 is secured. Preferably, the outer end of the rod 64 is fitted with a slide block 65 which is slidably mounted in a guide track 66 secured to top face 35 of the anchor block. The opposite ends of the double-acting cylinder 62 has inlet ports 67 as well as outlet ports 68 and each of these ports is provided with a suitable flow-control valve 70. A manifold 71 interconnects the outlet port 68 and this manifold is connected by a branch pipe 72 to the main supply pipe 16.

In order to operatively connect the apparatus 30 to the pump 25, there is provided power take-off means generally indicated at 75. The means 75, of course, is simply the shaft 40 on which the pulley 42 is non-rotatably mounted. Shaft 40 is provided with an extension on which a crank 77 is formed. A connecting rod 78 is secured to the crank 77 by means of a bearing 79 and a pin 80 connects the opposite forked end of the rod to the slide 65 on the piston rod 64.

Obviously, the pump 25 is not driven continuously by the apparatus 30 but rather is operated intermittently and at varying rates of speed regardless of the direction of rotation of the shaft 40. The pumping action however, is sufficient to draw in quantities of the surrounding sea water and to deliver this water suitably pressurized through the pipes 72 and 16 to the lake 15 on shore for use in the manner described.

The wave action and the tide currents which act upon the surface and subsurface floats 54 and 56 may cause the chain portions 50B and 50C to swing out of alignment with the pulleys 42 and 48 but these chain portions are prevented from jumping out of the rim grooves of the pulleys by guide means generally indicated at 84. As shown best in FIG. 4, the guide means 84 comprises a frame 86 which partly encloses the pulley 42. Rotatably mounted in the open upper part of the frame 86 are at least three horizontally disposed rollers 87 which are arranged to form a U-shaped fairlead for the chain portion 50B. The chain portion 50C coming off the pulley 48 is provided with a similarly constructed guide means generally indicated at 90 and which can be seen in FIGS. 2 and 3 only. Thus, the chain portions 50B and 50C can swing to a limited extent without leaving their driving engagement with the pulleys 42 and 48.

From the foregoing, it will be apparent I have provided a particularly effective, simply, and inexpensively constructed apparatus for driving machines of various types. The kinetic energy derived from wave action is converted by the apparatus 30 to a driving force which will operate the pumps day and night as long as the sea is undulating to even a limited degree. Each apparatus 30 need not to be used solely for the full purpose of operating one or more of the pumps 25 but can be coupled to a number of machines, for example, an air compressor or the like which would allow power to be generated for use elsewhere as required.

I claim:

1. Wave-powered driving apparatus comprising anchor means adapted to be supported in a body of water the surface of which is subject to wave action, a rotatable device secured to the anchor means, a flexible member having an intermediate portion thereof in driving engagement with the rotatable device, a first and a second float secured to opposite ends of the flexible member and cooperating with the rotatable device whereby said flexible member normally is supported in a substantially U-shaped configuration, said first float riding on the water surface and having greater buoyancy than the second float whereby said second float is maintained submerged below the surface of the water and above the rotatable device during variations in tide and wave actions, and power take-off means operatively connected to the rotatably device.

2. Wave-powered driving apparatus as claimed in claim 1, and including another rotatable device secured to the anchor means spaced on the first-mentioned rotatable device and engaged by the flexible member whereby said intermediate portion is disposed substantially normal to generally upright portions of the flexible member extending downwardly from the first and second floats.

3. Wave-powered driving apparatus as claimed in claim 2, and including guide means for limiting transverse swing of the generally upright portions of the flexible member.

4. Wave-powered driving apparatus as claimed in claim 3, in which each of said guide means comprises a frame supported by the anchor means to surmount a rotatable device, and a plurality of rollers mounted on the frame to be engaged by the flexible member.

5. Wave-powered driving apparatus comprising an anchor block adapted to rest on an ocean floor near the shore, first and second shafts journalled on the anchor block in spaced and parallel relation, aligned pulleys mounted one on each of the first and second shafts, a length of chain in driving engagement with the aligned pulleys, a subsurface float secured to one end of the chain, a surface float secured to an opposite end of the chain and having greater buoyancy than the subsurface float whereby said subsurface float is maintained submerged between the anchor block and the surface of the body of water, said chain being reciprocated as the floats alternately rise and fall in response to wave action whereby the pulleys are rotated first in one direction and then in the opposite direction, power take-off means adapted to connect one of the pulleys to a machine, and guide means limiting transverse swing of generally upright portions of the flexible member.

* * * * *